Patented Dec. 29, 1936

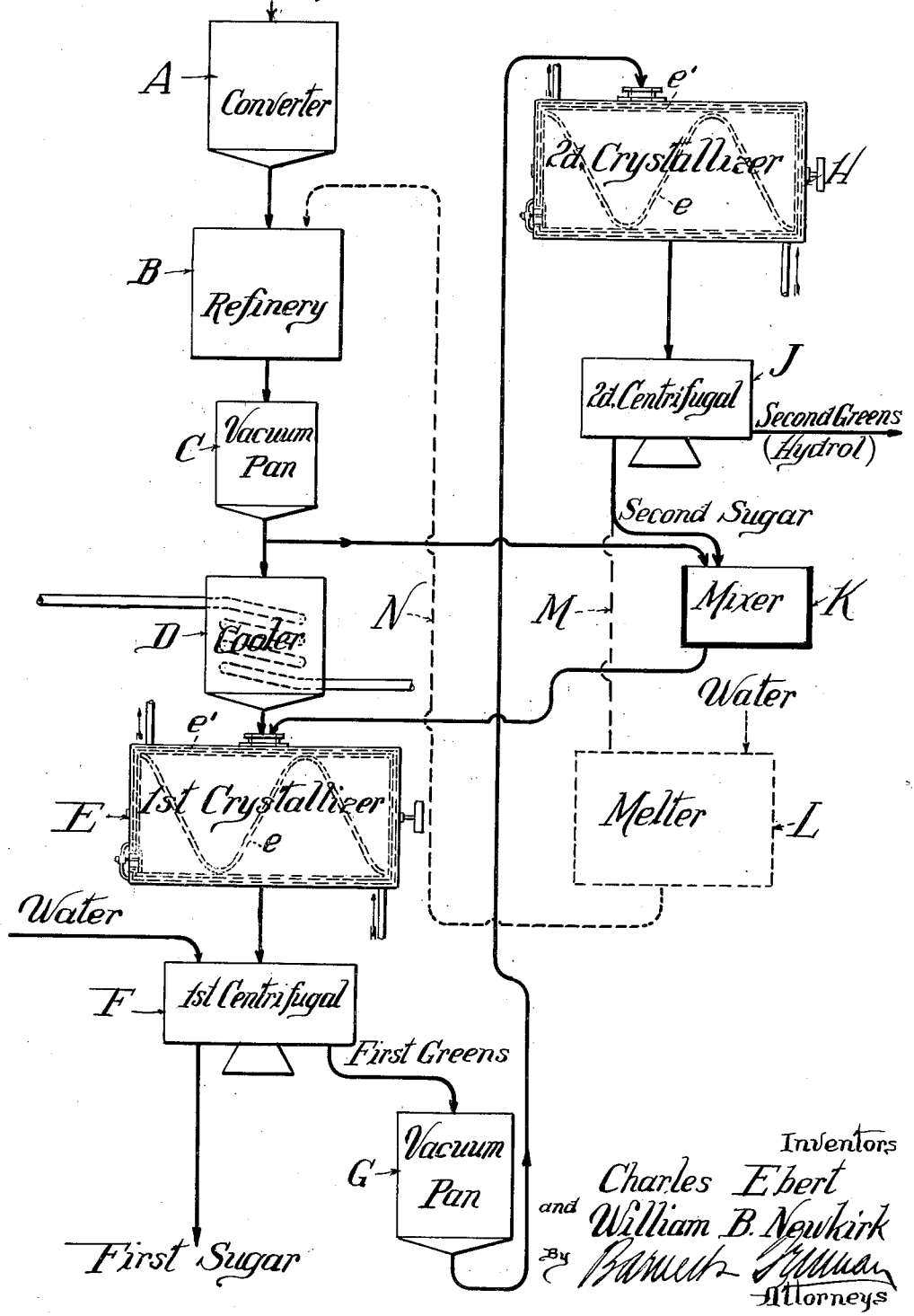

2,065,669

UNITED STATES PATENT OFFICE 2,065,669

METHOD OF CRYSTALLIZING DEXTROSE

Charles Ebert, Leonia, N. J., and William B. Newkirk, Western Springs, Ill., assignors to International Patents Development Company, Wilmington, Del., a corporation of Delaware Application April 17, 1935, Serial No. 16,766

6 Claims. (Cl. 127—60)

This invention relates to the manufacture of high purity crystalline dextrose, more particularly dextrose hydrate, from starch converted dextrose solutions; and the primary object of the invention is to provide certain improvements upon the method of making high purity crystalline dextrose described and claimed in United States patent to W. B. Newkirk, 1,521,830, January 6, 1925. According to the method disclosed in this patent solid phase dextrose is used in relatively large quantities for the purpose of controlling crystallization, that is, as the patent states, so that the quantity of solid phase is a significant factor in controlling crystallization, in distinction to previous methods in which very small quantities of "seed" crystals had been used for the purpose of initiating or hastening the start of crystallization, such quantities being in all cases too small to effect any substantial control of the process of crystallization. Patent No. 1,521,830 describes specifically a process in which instead of discharging the entire contents of a crystallizer, at the end of the crystallizing operation, a substantial proportion of the massecuite is retained for providing the solid phase necessary for controlling crystallization during the next operation. The amount of massecuite thus retained may vary considerably, smaller amounts of solid phase being sometimes used in the case of low purity liquors, such for example as mother liquors, than is required in the case of liquors of higher purity, such as the solution coming from the converter. The patent suggests retaining in the crystallizer 30% to 45% of each finished massecuite, in the case of liquors of high purity, and quantities down to 20% or even less for low purity liquors such as the mother liquors used for second and third sugars where the method of repeated crystallizations is practiced—this on an assumed basis of 40% to 60%, by weight, of solid phase in the massecuite.

As the process of this patent has been practiced, it has been customary to leave in the first crystallizer about 30% of massecuite, known as foots, containing about 50% of solid phase. The 70% of the massecuite discharged from the first crystallizer is centrifuged to remove the mother liquor, known as "first greens", and the dextrose crystals washed with fresh water in the centrifugal machine. This sugar, known as "first sugar", is dried and marketed.

The mother liquor from the centrifuging of the massecuite from the first crystallizer, after refining and concentrating, is subjected to a crystallizing operation in a second crystallizer in which about 25% to 30% of the massecuite is allowed to remain for controlling crystallization in the next batch. The rest of the massecuite is discharged to centrifugal machines from which the mother liquor is spun and discharged from the process. The second sugar, the purity of which is lower than that of the first sugar, is melted and returned to the process at a stage precedent to the first crystallizing operation, for example to the bone black filters through which the converted liquor is passed before being subjected to the crystallizing operation.

According to this method the yield of sugar is necessarily reduced, for a given crystallizer capacity, by the retention in the crystallizer of the relatively large proportion, in each case, of the finished massecuite. The melting of the second sugar requires time and equipment, and the fact that the melted sugar has to pass through certain stages of the process preceding crystallization reduces the capacity of the apparatus used at such stages of the process for handling the fresh or converted liquor. Furthermore, in the crystallizing apparatus the capacity to hold converted starch liquor is further reduced say 15% by volume due to the melted sugar so introduced with the converted starch liquor. The discharge of the entire batches from the crystallizer in a large measure prevents solid sugar from building up on the agitator or stirring mechanism and its shaft which under former practice necessitated regular cleaning of the apparatus at intervals with consequent loss of crystallizing capacity in the equipment as a whole.

The present invention improves upon the process just described by discharging all of the massecuite from the crystallizer to the centrifugal machines instead of retaining 30% more or less in the crystallizer as solid phase to control the next crystallizing operation, and by using, in place of the foots, sugar which has been centrifuged to remove its mother liquor, preferably, in the case of a process involving repeated crystallizations, a spun sugar from a crystallizing operation later in the series, for example in the case of a first sugar crystallization, with a spun second sugar. As a result (1) the yield of finished or marketable sugar from a crystallizer equipment of given capacity is increased; (2) the liquor treated in the crystallizer has a higher purity, if the magma is made of second sugar and first liquor, and this shortens the process and increases the quality of the product; and (3) the output of liquor in the stages of the process preceding crystallization is increased for equipment of a given capacity.

The invention is illustrated in the accompanying flow sheet diagram which shows the improved process in full lines, and, in dotted lines, certain steps of the old process which, in the new process, have been eliminated.

It will be understood that the drawing is not intended to show in detail all steps of a commercial process. The showing is diagrammatic.

Furthermore, the flow sheet illustrates one embodiment of the invention—the embodiment which is regarded as preferable—but should not be considered as imposing limitations on the invention except so far as certain claims may be specifically so limited.

Referring to the flow sheet, A designates the converter in which starch in suspension in acidified water is converted in the usual manner. The converted liquor is subjected to certain refining operations at B, including filtration over bone char or treatment of the liquid with finely divided activated carbon. C is a vacuum pan in which the refined liquor is concentrated to the proper degree for the crystallizing operation. D is a cooler for reducing the liquor to a suitable temperature for the crystallizing operation. The density of the liquor will depend upon its purity and the initial temperature of the liquor upon its density. Assuming that the process contemplates the production of the monohydrate, and assuming a liquor of 90% purity, a suitable density will be 40° Baumé, and a suitable initial temperature, after the liquor has been mixed with solid phase will be 105° F. These operating data are merely preferential and illustrative. E represents a crystallizer provided with the usual helicoidal agitator e and a water jacket e'. The refined, concentrated and cooled converter liquor is introduced into the crystallizer E and is mixed with the solid phase, or preferably with a mixture of solid phase and freshly converted or other unspent liquor, which is introduced into the crystallizer as hereinafter described. The temperature of the mixture is gradually reduced through radiation, facilitated by the operation of the agitator, and by circulation of cold water, either continuously or preferably at intervals, through the water jacket e' of the crystallizer. The final temperature may be about 80° F. The operation will ordinarily require from five to seven days.

The principles controlling the temperature reduction are fully set forth in the patent above referred to and in the prior patent to W. B. Newkirk, 1,471,347, October 23, 1923. The aim is to maintain a super-saturation which will be sufficient, under the controlling influence of the solid phase present, to build up the crystals as rapidly as possible without producing an excess of small crystals (a false grain condition) which, if it occurred, would render the purging and washing of the massecuite difficult or impractical.

At the end of the crystallizing operation the entire massecuite (according to the improved process of the present invention) is discharged into centrifugal machines F from which the mother liquor (first greens) is spun and in which the retained crystals are washed with fresh water. This sugar (first sugar) will be, under the conditions specified, a white, granular dextrose monohydrate of a purity very close to 100%.

The first greens from the centrifugal machines F are run into a vacuum pan G, and the liquor concentrated to a density of 40° or 41° Baumé.

The concentrated liquor from G may have a purity of 76% to 80% and is introduced into the second crystallizer H at a temperature of 105° F. The temperature in the crystallizer is gradually reduced over a period of approximately 12 to 16 days at which time the massecuite will be ready for centrifuging.

The treatment of the material at H, and in the subsequent steps of the process, may be varied considerably. In the preferred method illustrated in the flow sheet 30% of the massecuite in the second crystallizer is retained for providing solid phase control for the next crystallizing operation in this crystallizer, as in the process of Patent 1,521,830. In that case 70% of the massecuite is discharged into the second centrifugal machines J in which the mother liquor (second greens) is spun out of the solid phase, discharged from the process and sold as "hydrol". The sugar from the centrifugal machines J (second sugar), with or without washing with fresh water, is preferably, in any case, returned to the first crystallizer E; or at least such portion of this sugar as may be required for supplying the first crystallizer with solid phase in quantities adequate to control the crystallizing operation therein. Preferably, the second sugar is run into a mixer K where it is mixed with converter liquor, (or with a dextrose solution of higher purity or greater capacity for yielding solid sugar by crystallization than the second greens) and this liquor is introduced into the mixer at a density and temperature such that the equilibrium between the solid and liquid phases of the mixture will be unbalanced slightly, but not excessively, in the direction of crystallization of the dextrose out of the liquid phase. That is, crystallization will begin immediately in the mixer, but the super-saturation will not be sufficient to bring about a false grain condition. Under the other conditions specified the density of the converter liquor introduced into the mixer K may be 34° to 36° Baumé and the temperature about 85° to 90° F. The slurry from the mixer K is then run into the crystallizer E and is mixed with the liquor introduced from D, through operation of the agitator E, which may be revolved at any suitable velocity, for example, at one revolution in six minutes, which is the customary velocity at the present time. The amount of solid phase thus introduced into the crystallizer will depend upon the controlling effect desired. For the specific process described the solid phase may constitute 15% by weight of the complete batch. The slurry in the mixer may be made up of 50% solid and 50% liquid phase. The mixture of solid phase and solution introduced from mixer K into crystallizer E is the equivalent of the "foots" of the process of Patent 1,521,830. The crystal mass after centrifuging is still wet. The single crystals which may be very small are not cemented together in aggregates as occurs in the drying of the sugar, but readily dispersed as single crystals when mixed with the liquid in mixer K providing a much larger number of nuclei, for a given weight of solid phase, and hence a greater factor of control than if dry sugar aggregates were used. The present invention, therefore, involves in this respect, merely the substitution in the foots of fresh high purity liquor for the spent or mother liquor without substantial changes in the relationship between the solid and liquid phases. The solid phase, as employed in the present process, may, therefore, be said to be in the "massecuite" state, by which is meant that the crystals are not dry but are in a moist and growing state as they are in a massecuite. However, instead of being in a mixture with a spent mother liquor the crystals are mixed with a fresh solution liquid phase, in which the crystals are dispersible as individual crystals through the liquid, as they are in a massecuite, instead of being grouped in aggregates as is necessarily the case where dextrose sugar is dried.

If the second greens be subjected to a crystallizing operation for the production of a third sugar, it will be preferable to use this third sugar, after it has been centrifuged to remove its mother liquor, as solid phase for the operation in the second crystallizer; and in this case all, or substantially all, of the massecuite from the second crystallizer will be discharged to the centrifugal machines.

As a further possible modification, in the case of a process involving only two crystallizations, all of the massecuite from the second crystallizer may be discharged to the centrifugal machines, and a part of the spun sugar used for the first crystallizer and the rest returned as solid phase to the second crystallizer.

In the case of a one crystallization process some advantage of the invention may be obtained by centrifuging all of the massecuite from crystallizers, and using as much of this first sugar as may be necessary for supplying these crystallizers with their necessary solid phase.

In the flow sheet the melter, used in the old process, is indicated with dotted lines at L. M indicates the connection from the second centrifugals to the melter and N the connection from the melter to the first bone black filter. By the elimination of the melter and the return of the melted liquor to the filter B, the capacity of the refinery apparatus at B, and of the finishing pan C for handling fresh liquor from the converter A will be increased. This is of particular importance since with the increased capacity of the crystallizer E, due to the discharge of the entire massecuite instead of only a portion of the same, additional equipment at B and C would be necessary except for the elimination of the melted sugar stream through N.

A preferred embodiment of the invention has been shown and described and certain modifications thereof suggested. Other modifications will occur to those skilled in the art. Hence, it is intended to cover all possible modifications within the scope of the appended claims.

We claim:

1. In the process of crystallizing dextrose from a starch converted dextrose solution by the method of crystallization in motion with temperature reduction, in which solid phase dextrose is employed in quantities sufficient to be a significant factor in controlling crystallization: the improvement which comprises using, as solid phase, dextrose crystals in the massecuite state but substantially free from mother liquor.

2. In the process of crystallizing dextrose hydrate from a starch converted dextrose solution by the method of crystallization in motion with temperature reduction, in which solid phase dextrose is employed in quantities sufficient to be a significant factor in controlling crystallization: the improvement which comprises crystallizing the solution and removing the mother liquor from the massecuite; crystallizing said mother liquor and removing the resultant mother liquor from this massecuite; mixing the sugar from the second mentioned crystallization with fresh solution at a concentration and temperature, having regard to the purity of the liquor, at which the mixture has a slight crystallizing super-saturation; and using this mixture for providing solid phase for a subsequent crystallization at the stage of the process corresponding to said first mentioned crystallization as said process proceeds.

3. The process of crystallizing dextrose from a starch converted dextrose solution by the method of crystallization in motion with temperature reduction, which comprises: crystallizing the solution and purging the massecuite of its mother liquor; mixing a part of the purged crystals while in the massecuite state with unspent solution; and using the mixture for providing solid phase for a subsequent crystallization.

4. The process of crystallizing dextrose from a starch converted dextrose solution by the method of crystallization in motion with temperature reduction, which comprises: crystallizing the solution and removing most of the mother liquor therefrom; and using crystallized dextrose obtained in this manner mixed with unspent dextrose solution for providing solid phase for a subsequent crystallization in an amount from about 8% to 22.5% of the solution used for said subsequent crystallization.

5. The process of crystallizing dextrose hydrate from a starch converted dextrose solution by the method of crystallization in motion with temperature reduction, which comprises: crystallizing the solution and purging the massecuite of its mother liquor; mixing a part of the purged crystals with unspent solution; and using the mixture for providing solid phase for a subsequent crystallization.

6. In the process of crystallizing dextrose hydrate from a starch converted dextrose solution by the method of crystallization in motion with temperature reduction which comprises: crystallizing the solution; replacing the mother liquor in the massecuite from said crystallizing operation with unspent solution; and using this mixture for providing solid phase for a subsequent crystallizing operation in quantities sufficient to be a significant factor in controlling crystallization.

CHARLES EBERT.
WILLIAM B. NEWKIRK.